United States Patent Office 2,773,843
Patented Dec. 11, 1956

2,773,843

TREATING SILICA MAGNESIA MATERIALS

Charles N. Kimberlin, Jr., and Elroy M. Gladrow, Baton Rouge, La., assignors to Esso Research and Engineering Company, a corporation of Delaware No Drawing. Application April 21, 1954,
Serial No. 424,762

7 Claims. (Cl. 252—457)

The present invention relates to the treatment of materials suitable for use in catalytic conversion of hydrocarbons to produce motor fuels and as adsorbents and more particularly relates to the treatment of silica-magnesia containing materials.

It is known that catalysts useful for catalytic conversion of hydrocarbons may have the same chemical composition but may differ widely in their catalytic activity when prepared in different ways or when given certain treatments.

Silica magnesia catalysts are characterized by relatively high surface areas and relatively small pore volumes which suggests a very tight pore structure.

Numerous pretreatments such as heating the catalyst to 1350° F. or higher or subjecting the catalyst to steam at relatively high temperature and pressure for an extended period of time deactivate the catalyst and such deactivation is accompanied by a corresponding loss in surface area. Little change is noted in the pore volume after the steam deactivation test.

According to the present invention the surface area and the pore volume of silica-magnesia gel are increased above the value obtained when the gel is oven dried or treated in the conventional manner. The present invention is applicable to freshly prepared silica magnesia hydrogel, to standard activated silica-magnesia catalyst or used silica-magnesia catalyst.

According to the present invention the surface area of silica-magnesia gel is markedly increased by mixing it with water and heating the mixture under pressure to an elevated temperature. After the prescribed pressure has been reached, water vapor is slowly released while additional heat is supplied to maintain pressure and this is continued until the silica magnesia is essentially dry.

Using the pressure drying technique of the present invention results in increasing the surface area and pore diameter of silica-magnesia gels including the dried fresh or used gel catalyst and the hydrogel. The surface area of the pressure treated silica-magnesia is well retained as shown by retention of a major portion of the surface area of the pressure dried silica-magnesia after steaming for 24 hours at 60 pounds per sq. inch gage (p. s. i. g.) and at 1050° F.

The pressure drying of silica-magnesia catalysts or gels containing 20 to 35% magnesia may be effected at a pressure of about 200 to 800 lbs. per sq. inch gage and at a temperature of about 350° and 600° F., preferably 380° F. to 520° F., preferably 400° to 500° F. The pressure dried silica magnesia may contain up to 20% residual water which may be removed by heating at atmospheric pressure at an elevated temperature of about 1000° to 1300° F. for about 2 to 6 hours.

For catalytic cracking a gas oil or the like the temperature may be between about 850° and 1000° F. and the regeneration of the catalyst between about 950° and 1100° F. In a fluid solids system the weight of oil per hour per weight of catalyst in the reactor may be between about 0.5 and 3.0. Fixed beds or moving beds of catalyst may be used instead of the fluid solids bed.

The process of the present invention generally includes the steps of charging the silica-magnesia hydrogel or an aqueous slurry of powdered silica magnesia catalyst to an autoclave and heating. The pressure is allowed to build up to a prescribed value, the bulk of the water remaining in the liquid phase. After the prescribed pressure has been reached, water vapor is slowly released from the autoclave while heating is continued to maintain the prescribed pressure and this is continued until the silica-magnesia material is essentially dry.

Silica magnesia was prepared as follows:

About 66.7 gallons of a commercial sodium silicate ($Na_2O:3.25SiO_2$) solution having a specific gravity of about 1.21 were mixed with 33.3 gallons of a cold sulfuric acid solution of about 1.19 specific gravity. The temperature of the resulting silica sol was kept below 50° F. Using vigorous agitation, a slurry comprising 12.75 pounds of finely ground magnesia in 14.5 gallons of water were added to the silica sol. After about 4–5 minutes the mixture set to a hard hydrogel. The hydrogel was washed free of soluble salts with water. The magnesia employed in the preparation of this catalyst was a commercial material, grade 2661 produced by the Westvaco Chlorine Products Corporation. This magnesia is believed to have been produced by precipitation from sea water, washing, and burning the precipitate at 800° to 900° C. for 5 to 6 hours. However, other varieties of magnesia may also be employed.

One portion of the silica-magnesia hydrogel mixture was then dried by heating in an oven at a temperature of about 250° F. and then calcined at 1250° F. for about 3 hours. The activated catalyst was divided into two parts and one was tested in a fixed bed cracking unit and the other part was steamed at 1050° F. and 60 p. s. i. g. for 24 hours and then tested in a fixed bed cracking unit. These portions or parts are designated catalyst A in column 1 and 2 of Table I.

Another portion of the silica magnesia hydrogel mixture was charged to a stainless steel autoclave to about half fill the autoclave. The autoclave was closed and rapidly heated to a pressure of about 600 p. s. i. g. (490° F.), about 2 hours being required for heating up the autoclave to this pressure. When the 600 p. s. i. g. pressure was reached, water vapor is released at such a rate to maintain the pressure in the autoclave at about 600 p. s. i. g. Additional heat was continuously supplied to maintain pressure and temperature. Water was removed from the silica-magnesia hydrogel until the water content was reduced from about 95% to about 10%. This period of drying required about 3 hours. The autoclave was then cooled, opened and the dried material was activated by heating for 3 hours at 1250° F. This activated catalyst was divided into two parts and one was tested in a fixed bed cracking unit. The other part was steamed at 1050° F. and 60 p. s. i. g. pressure for 24 hours and then tested. This catalyst is designated B in columns 3 and 4 of Table I.

The following Table I presents data on catalysts A and

B (pilled to ¾₁₆" by ¾₁₆" cylinders) and tested in a fixed bed testing unit.

TABLE I

*East Texas light gas oil; 850° F.; 2 hour cycle*

CRACKING TEST

| Catalyst Activation | A | | B | |
|---|---|---|---|---|
| | 1,250° F.[1] | Steamed[2] | 1,250° F.[1] | Steamed[2] |
| Surface Area, M²/g | 352 | 236 | 458 | 398 |
| Pore Volume, cc./g | 0.22 | 0.15 | 0.48 | 0.49 |
| Cracking Test: | | | | |
| Feed Rate, W./Hr./W[3] | 0.5 | 0.5 | 0.5 | 0.5 |
| D+L, Vol. percent | 61 | 49 | 60 | 59 |
| Conversion, Vol. percent | 65 | 50 | 63 | 60 |

[1] Activated 3 hours at 1250° F.
[2] Steamed 24 hours at 1050° F. and 60 p. s. i. g. pressure.
[3] Weight of oil feed per hour per weight of catalyst.

These data show that the pressure-drying treatment in making catalyst B produced significant increases in both surface area and pore volume, and that these improvements persist after steaming. Less than about 14% of the surface was lost during the steaming of catalyst B while about 33 percent of the surface of catalyst A was lost during steaming. The pressure drying operation practiced with catalyst B also produced a large increase in the pore volume, which increase persists after steaming. The cracking data show catalyst B to be about as active as catalyst A after 1250° activation. After steaming, however, catalyst B essentially maintains its activity, while catalyst A suffers a loss of about 20% of its activity.

The process was also used for treating equilibrium silica-magnesia catalyst from a commercial fluid cracking unit. The catalyst contained about 33% MgO and the rest silica. The particle size ranged from about 15 to 120 microns. The catalyst was prepared as follows. An 11.5% silica sol is prepared by mixing 2 volumes of Na₂O·3.25SiO₂, specific gravity 1.21, with 1 volume of H₂SO₄, specific gravity 1.19. The silica sol contains an excess of acid, being about 0.67 N H₂SO₄. A 20% slurry of magnesia is prepared and allowed to stand 24 hours to complete hydration. The magnesia employed was a commercial product, grade 2665 obtained from the Westvaco Chlorine Products Corporation. It is believed to have been produced by precipitating from sea water, washing, and burning at 300° to 400° C. for about 4 hours. However, other grades of magnesia may also be used. The silica sol and magnesia slurry are mixed in a two fluid mixing muzzle in the proper proportions to give a 67% SiO₂ and 33% MgO content. The mixture transforms to a hydrogel in about 3 seconds. The hydrogel is aged at room temperature for 24 hours, and washed with 110° F. water for 55 hours. The washed hydrogel is dried on a rotary dryer to about 20% volatile matter, then rewashed and redried. The catalyst is then used in a commercial fluid cracking operation.

By equilibrium catalyst is meant catalyst taken from an operating cracking unit. When fresh catalyst is first put in a cracking unit it has a relatively high activity but after it has been in the cracking unit for some time, this activity drops off rapidly and levels off at a lower activity but there is a general downward trend. Equilibrium catalyst is that catalyst which has been in the cracking unit for an extended period of time and which is maintained at a substantially constant activity and selectivity by the addition of fresh make-up catalyst.

One portion of the equilibrium silica-magnesia catalyst was regenerated prior to testing by heating it for 16 hours at 1000° F. in air and then pilled and activated for 3 hours at 1250° F. and half of it tested in a fixed catalyst bed testing unit. The other half was steamed for 24 hours at 1050° F. and 60 p. s. i. g. and tested in a fixed bed testing unit. This catalyst is designated C in Table II and results are reported in columns 1 and 2.

Another portion of the same batch of equilibrium silica-magnesia catalyst was slurried in water using 6 liters of water per kilogram of catalyst and heated to 600 p. s. i. g. and 490° F. in an autoclave in the same manner as given above in connection with catalyst B. The water vapor was then released slowly while maintaining pressure as above described. The autoclave was then cooled and the cool silica magnesia catalyst removed from the autoclave and regenerated by heating for 16 hours at 1000° F. in air in the same manner as done to catalyst C. This catalyst is designated D in columns 3 and 4. The catalyst was pilled and activated for 3 hours at 1250° F. and half of it tested in a fixed bed catalyst testing unit. The other half was steamed for 24 hours at 1050° F. and 60 p. s. i. g. and similarly tested. Table II reports data on the activity and selectivity of catalysts C and D.

TABLE II

*East Texas light gas oil; 850° F.; 2 hour cycle*

CRACKING TESTS

| Catalyst Activation | C | | D | |
|---|---|---|---|---|
| | 1,250° F.[2] | Steamed[3] | 1,250° F.[2] | Steamed[3] |
| Surface Area, M²/g | 254 | 163 | 304 | 224 |
| Pore Volume, cc./g | 0.24 | 0.17 | 0.26 | 0.20 |
| Cracking Tests: | | | | |
| Feed rate, W./Hr./W[1] | 0.5 | 0.5 | 0.5 | 0.5 |
| D+L, Volume Percent | 41.5 | 27 | 55 | 45.5 |
| Conversion, Vol. Percent | 46 | 28.5 | 60 | 50 |

[1] Weight of oil feed per hour per weight of catalyst.
[2] Regenerated, activated 3 hours at 1250° F.
[3] Regenerated, steamed 24 hours at 60 p. s. i. g. pressure at 1050° F.

These data illustrate clearly the higher activity and higher steam stability of the pressure dried equilibrium catalyst D.

The data in Table II further show the marked increase in surface area of the pressure dried catalyst (column 3 of Table II) where the surface area increased from 254 M²/g. (column 1 in Table II) to 304 M²/g. The pore volume also increased from 0.24 cc./g. (column 1 in Table II) to 0.26 cc./g. (column 3 in Table II). In addition there was an increase of about 14 volume percent in the total conversion and in the conversion to gasoline (compare columns 1 and 3 in Table II). Comparing columns 2 and 4, the steamed catalysts, an advantage is also shown from the pressure drying.

In another example commercial silica-magnesia catalyst containing about 33% magnesia is made by the same method as described above for catalyst C. The catalyst was activated by heating the fresh catalyst at 1250° F. for 3 hours in an oven.

Another batch of the same commercial silica-magnesia catalyst was slurried with water using about 7.2 gallons of water per ten pounds of catalyst. The slurry was put in an autoclave and heated to 600 p. s. i. g. and 490° F. which took about 2 hours. When the 600 p. s. i. g. pressure was reached, water vapor was released from the autoclave at such a rate as to maintain the pressure at about 600 p. s. i. g. within the autoclave. Heat was continually supplied to the system to maintain temperature and pressure. The drying operation is continued under about 600 p. s. i. g. until the water content of the system is reduced from about 73 to about 5 to 10%. This period of drying required about 3 hours. The autoclave is then cooled and the pressure dried product is activated by heating for about 1250° F. for 3 hours.

The oven dried silica-magnesia catalyst had a surface area of 408 M²/g. and a pore volume of 0.25, while the pressure dried catalyst had a surface area of 484 M²/g. and a pore volume of 0.37. Thus it will be seen that both the surface area and pore volume were increased an appreciable amount.

The above effects with silica-magnesia are not due to the action of the superheated water. A portion of the silica-magnesia hydrogel prepared as described in the preparation of catalyst A above is charged to an autoclave and heated at 490° F. and 600 p. s. i. g. pressure for two hours followed by cooling without releasing any of the water vapor. After drying in an oven at 250° F. and then activating the catalyst by heating it 3 hours at 1250° F. this material has a surface area of 348 $M^2/g$. This compares with a surface area of 352 $M^2/g$. for a sample of the same hydrogel that did not receive the pressure soaking treatment (see catalyst A in Table I above). In another separate operation 10 pounds of the fresh commercial silica-magnesia prepared as described for catalyst C is slurried with 7.2 gallons of water. The aqueous slurry is charged to the autoclave and heated to 490° F. and 600 p. s. i. g. pressure and maintained at these conditions for 2 hours. After cooling, the aqueous slurry is discharged and oven dried at 250° F. After activating the catalyst by heating 3 hours at 1250° F., the catalyst has a surface area of 370 $M^2/g$. This compares with a surface area of 408 $M^2/g$. for the fresh commercial silica-magnesia catalyst which did not receive the high pressure hydrothermal treatment. These two illustrations serve to show that the improved surface areas obtained by the method of our invention are not caused by the action of superheated water.

The time of heating the silica magnesia under pressure is not critical but may vary between about 0.25 and 4 hours and the time of release of water vapor during drying may vary between about 1 and 6 hours. The temperature during drying may vary between about 350° and 600° F.

What is claimed is:

1. A process for increasing the surface area and pore volume of silica-magnesia catalyst containing a major proportion of silica which comprises subjecting an aqueous mixture of silica-magnesia particles containing a large amount of water to a pressure of about 600 p. s. i. g. and a temperature of about 490° F. in a confined zone, then drying said silica magnesia particles by allowing slow continuous escape of water vapor from said confined zone for about 3 hours while heating said confined zone to maintain the pressure therein at about 600 p. s. i. g. and the temperature at about 490° F. until the silica-magnesia particles are substantially dry, then cooling said confined zone and removing the treated and dry silica-magnesia catalyst from said confined zone.

2. A process for increasing the surface area and pore volume of silica-magnesia catalyst containing a major proportion of silica which comprises subjecting a water slurry of silica-magnesia catalyst particles containing between about 73 and 95% water to a pressure between about 200 and 800 p. s. i. g. and to a temperature between about 350° and 600° F. in a confined zone for a period of time between about 0.25 and 4 hours, then drying said silica magnesia catalyst particles by allowing slow continuous escape of water vapor from said confined zone while heating said confined zone to maintain the selected elevated temperature and pressure for about 1 to 6 hours until the silica-magnesia particles are substantially dry, then cooling said confined zone and removing the treated and dry silica-magnesia catalyst from said confined zone.

3. A process for increasing the surface area and the pore volume of hydrous silica magnesia catalyst particles containing a major proportion of silica which comprises subjecting hydrous silica magnesia catalyst particles to a pressure between about 200 and 800 p. s. i. g. and a temperature between about 350° and 600° F. for a period about 0.25 and 4 hours in a confined zone, then drying the silica magnesia catalyst particles by heating said confined zone to maintain the selected temperature and pressure and permitting continuous slow escape of water vapor from said confined zone to maintain the desired pressure for a period between about 1 and 6 hours until the silica magnesia catalyst particles are substantially dry and then cooling and removing the treated and dry silica-magnesia catalyst particles from said confined zone.

4. A process according to claim 3 wherein the silica-magnesia catalyst particles contain 20 to 35% magnesia when dried, the selected pressure is about 600 p. s. i. g., the temperature is about 490° F. and the time of drying during which water vapor is released from said confined zone while maintaining the desired temperature is about 3 hours.

5. A process according to claim 3 wherein the hydrous silica magnesia particles comprise a hydrogel.

6. A process according to claim 3 wherein the hydrous silica magnesia particles comprise a water slurry of silica magnesia particles.

7. A process according to claim 3 wherein the silica magnesia catalyst particles are ones which have been used for an extended period and in a number of cracking and regeneration cycles and as a result the activity of the catalyst has dropped off and silica magnesia particles are mixed with water to form a water slurry and the process according to claim 3 revivifies the used silica magnesia catalyst particles and increases the surface area and the pore volume of said silica magnesia catalyst particles.

References Cited in the file of this patent

UNITED STATES PATENTS

| | | |
|---|---|---|
| 2,373,043 | Mayer | Apr. 3, 1945 |
| 2,477,664 | Shabaker | Aug. 2, 1949 |
| 2,477,695 | Kimberlin | Aug. 2, 1949 |
| 2,489,334 | Shabaker | Nov. 29, 1949 |
| 2,495,723 | Hormann | Jan. 31, 1950 |
| 2,693,457 | Drake et al. | Nov. 2, 1954 |
| 2,698,305 | Plank et al. | Dec. 28, 1954 |